United States Patent
Su

(10) Patent No.: US 6,691,836 B2
(45) Date of Patent: Feb. 17, 2004

(54) BRAKE AUXILIARY DEVICE

(76) Inventor: Chiang-Shui Su, 9F.-5, No. 428, Pei-Tuen Rd., Taichung City (TW)

( * ) Notice: Subject to any disclaimer, the term of this patent is extended or adjusted under 35 U.S.C. 154(b) by 0 days.

(21) Appl. No.: 10/188,829

(22) Filed: Jul. 5, 2002

(65) Prior Publication Data

US 2003/0006103 A1 Jan. 9, 2003

(30) Foreign Application Priority Data

Jul. 6, 2001 (TW) ........................................ 90116533 A

(51) Int. Cl.⁷ ................................................. B60T 1/00
(52) U.S. Cl. ......................... 188/2 R; 188/74; 188/382; 303/9
(58) Field of Search ................................. 188/4 R, 2 R, 188/74, 382, 72.1, 72.7, 71.1; 303/9, 191, 1

(56) References Cited

U.S. PATENT DOCUMENTS 1,495,697 A * 5/1924 Kosarik ...................... 188/4 R
2,951,559 A * 9/1960 Shearman et al. ............ 188/29
4,027,898 A * 6/1977 Steen ........................... 267/242
4,953,667 A * 9/1990 Bigo ............................ 188/31
6,409,187 B1 * 6/2002 Crow, Jr. ...................... 188/29

* cited by examiner

Primary Examiner—Matthew C. Graham
Assistant Examiner—Mariano Sy
(74) Attorney, Agent, or Firm—Shoemaker and Mattare

(57) ABSTRACT

A brake auxiliary device is proposed, including a resilient mechanism having an upper support member mounted on a bottom surface of a vehicle, and a lower support member properly spaced apart from the upper support member at a position above a wheel shaft of the vehicle; a transmission mechanism positioned between the upper and lower support members of the resilient mechanism, and rotatably abutting against the lower support member; and a drive mechanism coupled to the transmission mechanism, for outputting power to operationally drive the transmission mechanism. The transmission mechanism is adapted to operate to induce displacement of the lower support member with respect to the upper support member, and to generate up and down movement for the vehicle, so as to raise vertical upright pressure applied from wheels of the vehicle to the ground, and thereby increase friction between the wheels and the ground in favor of braking implementation.

11 Claims, 3 Drawing Sheets

BRAKE AUXILIARY DEVICE

FIELD OF THE INVENTION

The present invention relates to brake auxiliary devices, and more particularly, to a brake auxiliary device for raising vertical upright pressure applied from wheels of a vehicle to the ground, so as to increase friction between the wheels and the ground in favor of braking implementation.

BACKGROUND OF THE INVENTION

Currently, moving vehicles utilize brake devices mounted therein for deceleration to stop the vehicles. When a vehicle moves on a road, with a fixed weight of the vehicle, the maximum static friction generated between tires of the vehicle and the road surface is substantially fixed. Therefore, to decelerate or brake the vehicle from a certain velocity to a complete stop also takes an approximate fixed braking distance to implement; this thereby makes most drivers used to drive at a regular speed and keep a constant distance from other vehicles in front of them. However, due to changes in an external or driving environment, such as different weather conditions e.g. raining, or different road conditions e.g. a downgrade, or even changes in driver's mental or emotional conditions, the braking distance required for stopping the vehicle may increase and thus cause dangerous accidents or emergencies if the vehicle cannot be properly stopped without provision of sufficient braking distance.

Therefore, the problem to be solved herein is to provide a brake auxiliary device, for effectively increasing friction between wheels of a vehicle and the ground, so as to reduce a braking distance required for decelerating the vehicle to stop in favor of braking implementation.

SUMMARY OF THE INVENTION

An objective of the present invention is to provide a brake auxiliary device, so as to raise vertical upright pressure applied from wheels of a vehicle to the ground, and thereby to increase friction between the wheels and the ground in favor of braking implementation.

Another objective of the invention is to provide a brake auxiliary device, which allows brakes of a vehicle to be properly controlled in a manner as to flexibly adjust a braking distance for the vehicle in response to practically driving conditions, thereby improving stability of vehicle operation.

In accordance with the above and other objectives, the present invention proposes a brake auxiliary device applied to a wheel of a vehicle. The brake auxiliary device comprises a resilient mechanism having an upper support member mounted on a bottom surface of the vehicle at a position corresponding to the wheel, and a lower support member properly spaced apart from the upper support member and positioned above a shaft of the wheel; a transmission mechanism positioned between the upper and lower support members of the resilient mechanism in a manner that, the transmission mechanism rotatably abuts against the lower support member; and a drive mechanism connected to the bottom surface of the vehicle by a connecting member, and electrically coupled to the transmission mechanism for outputting power to operationally drive the transmission mechanism. When the transmission mechanism is driven to rotate by power outputted from the drive mechanism, rotation of the transmission mechanism operates to induce displacement of the lower support member with respect to the upper support member of the resilient mechanism, and thus to generate up and down movement for the vehicle, so as to raise vertical upright pressure applied from the wheel of the vehicle to the ground, and to thereby increase friction between the wheel and the ground in favor of braking implementation.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
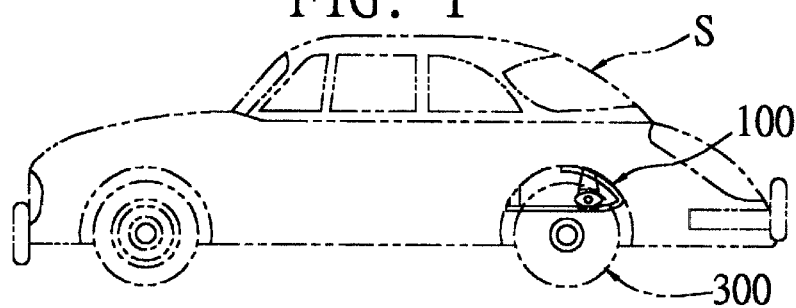
FIG. 1 is a schematic diagram showing a vehicle mounted with a brake auxiliary device according to the invention.

FIG. 1 illustrates a vehicle mounted with a brake auxiliary device according to the present invention. During deceleration of a moving vehicle, the center of gravity of the vehicle would shift in position relatively from a rear part to a front part of the vehicle, making front wheels of the vehicle applied with 65% to 75% of the total braking force generated for deceleration of the vehicle, such that the rear part of the vehicle tends to be lifted up. In response to the foregoing problem of uneven distribution of the braking force, as shown in FIG. 1, the brake auxiliary device 100 according to the invention is mounted at a relatively rear part of a vehicle S and applied to a rear wheel 300 of the vehicle 5, so as to increase vertical upright pressure generated from the rear wheel 300 to the ground, and thereby to increase friction between the rear wheel 300 and the ground. As a result, the total braking force for the vehicle S would be increased and evenly distributed at each wheel, which helps effectively reduce a braking distance required for deceleration of the vehicle S to stop, and allows a braking or decelerating process to be stably performed in favor of safety in vehicle operation.

Figure 2A:
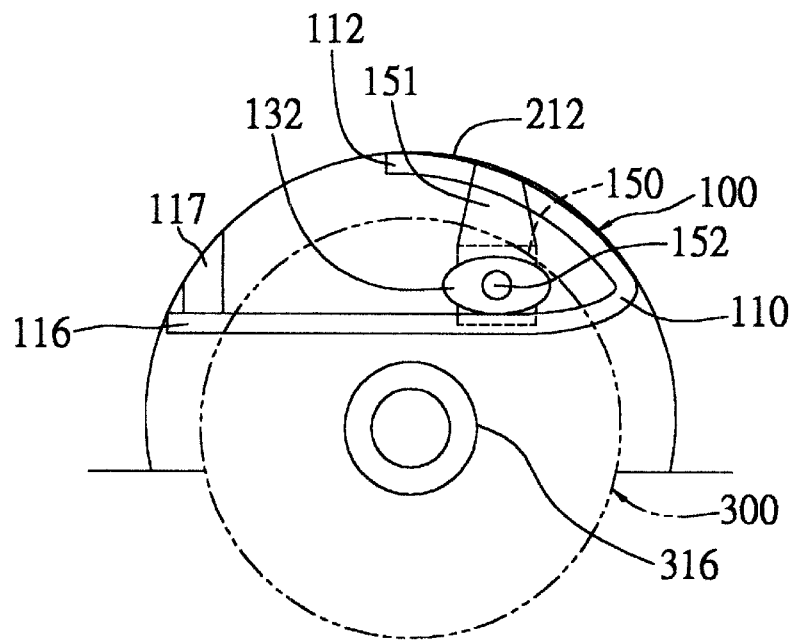
FIG. 2A is a side view of the brake auxiliary device according to a preferred embodiment of the invention.

FIG. 2A illustrates the brake auxiliary device 100 according to a preferred embodiment of the invention. As shown in FIG. 2A, the brake auxiliary device 100 applied to the rear wheel 300 of the vehicle 5, is composed of a resilient member 110, a transmission member 132, and a drive member 150. The resilient member 110 is shaped to form an upper support portion 112 connected to a bottom surface 212 of the vehicle 5, and a lower support portion 116 detachably abutting against an abutment member 117 formed on the bottom surface 212. The resilient member 110 is preferably situated above a wheel shaft 316 of the rear wheel 300, SO as to allow the lower support portion 116 to be adapted to act on the wheel shaft 316 in operation of the brake auxiliary device 100, and thereby to increase vertical upright pressure applied from the rear wheel 300 to the ground. The resilient member 110 is made of a resilient metal material e.g. elastomer, and bent to form the upper and lower support portions 112, 116, wherein the lower support portion 116 is greater in length than the upper support portion 112.

The transmission member 132 is positioned between the upper and lower support portions 112, 116 of the resilient member 110, and rotatably abuts against the lower support portion 116. The transmission member 132 can be shaped as an ellipse or an eccentric, such as a cam, that has a longer and a shorter axes, allowing the longer axis to be situated substantially in parallel to the lower support portion 116, as shown in FIG. 2A. When the brake auxiliary device 100 is in use, the transmission member 132 is adapted to rotate to an upright position with respect to the lower support portion 116 where the longer axis of the transmission member 132 is vertically in contact with the lower support portion 116, which is thereby pressed downwardly by rotation of the transmission member 132 toward the wheel shaft 316 of the rear wheel 300 (described in detail hereinafter).

Figure 2B:
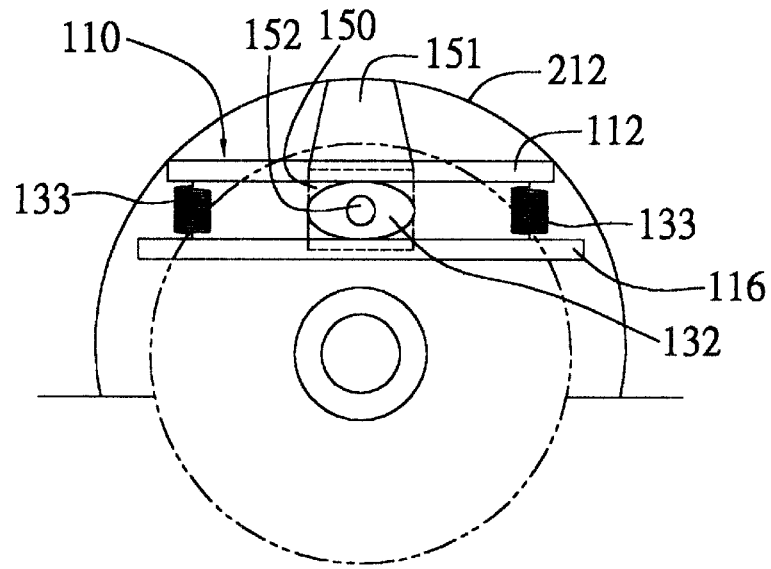
FIG. 2B is a side view of the brake auxiliary device according to another preferred embodiment of the invention.

FIG. 2B illustrates another embodiment for arrangement of the resilient member 10 and transmission member 132. This embodiment differs from the one shown in FIG. 2A in that, the upper and lower support portions 112, 116 of the resilient member 110 in FIG. 2B are interconnected at end positions thereof by means of a plurality of springs or elastomers 133, allowing the transmission member 132 to be interposed between the upper and lower support portions 112, 116.

Figure 6:
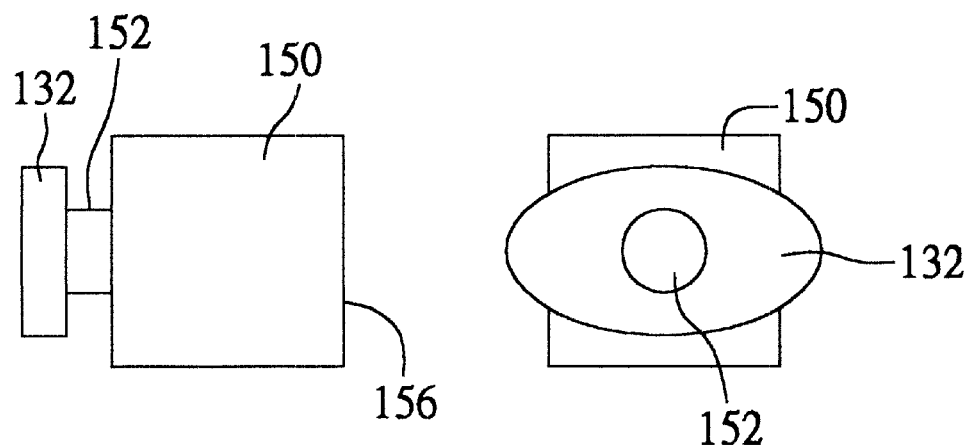
FIG. 6 is a schematic diagram showing different side views of connection between a transmission member and a drive member of the brake auxiliary device according to the invention

The drive member 150 is connected to the transmission member 132 for operationally driving the transmission member 132, and further connected to the bottom surface 212 of the vehicle S via a connecting portion 151, wherein as shown in FIG. 6, the drive member 150 is integrally coupled via a shaft 152 thereof to the transmission member 132. The drive member 150 used herein is a retarded motor, and provided with gears for outputting proper power and torque to operate the transmission member 132.

Figure 3:
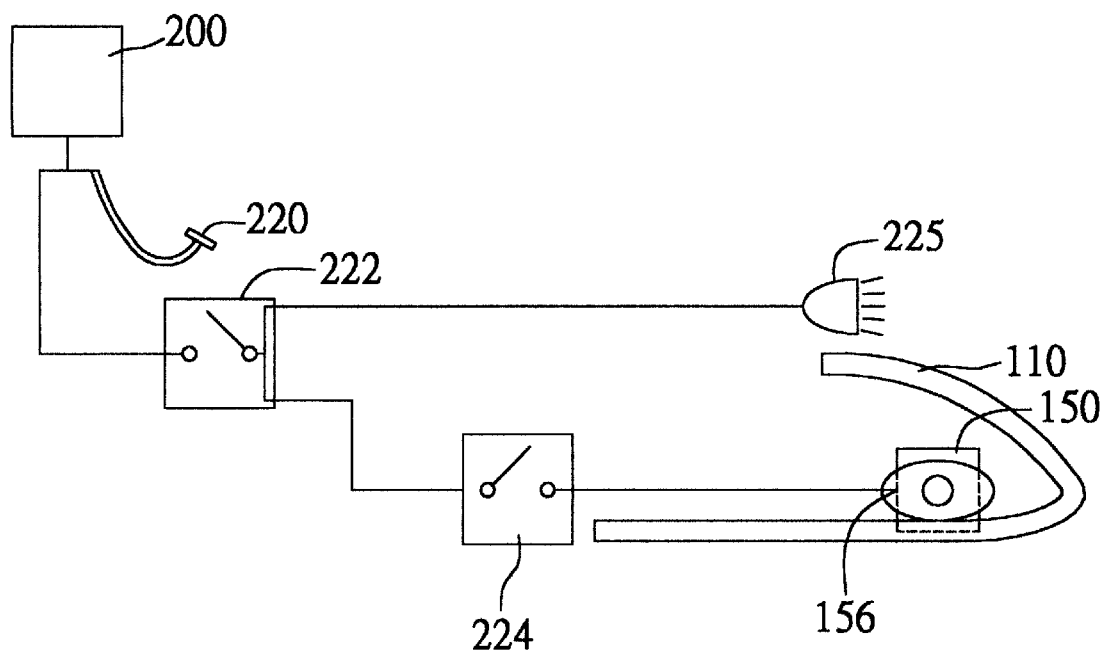
FIG. 3 is a schematic diagram showing electrical connection for the brake auxiliary device according to the invention.

FIG. 3 illustrates electrical connection for the brake auxiliary device 100 to an external power source. As shown in FIG. 3, the drive member 150 of the brake auxiliary device 100 has a power input port 156 electrically connected to a power source 200 of the vehicle 5, which power source 200 is co-used for supplying power to a braking light 225 of the vehicle S. A first power switch 222 is provided between the power input port 156 and the power source 200, and a second power switch 224 is mounted between the first power switch 222 and the power input port 156, such that the drive member 150 is electrically connected to the power source 200 via the first and second power switches 222, 224. The power source 200 and the drive member 150 are also electrically connected to a brake pedal 220, 50 as to allow a driver to manually control the brake pedal 220 for deciding whether to activate operation of the drive member 150.

Figure 4:
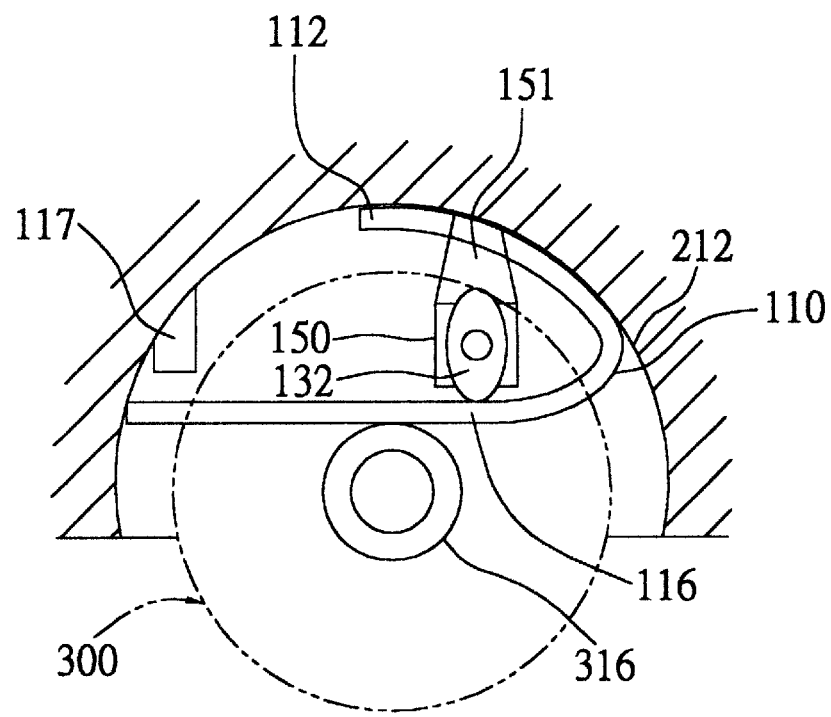
FIG. 4 is a schematic diagram showing an operational status of the brake auxiliary device according to the invention.
Figure 5:
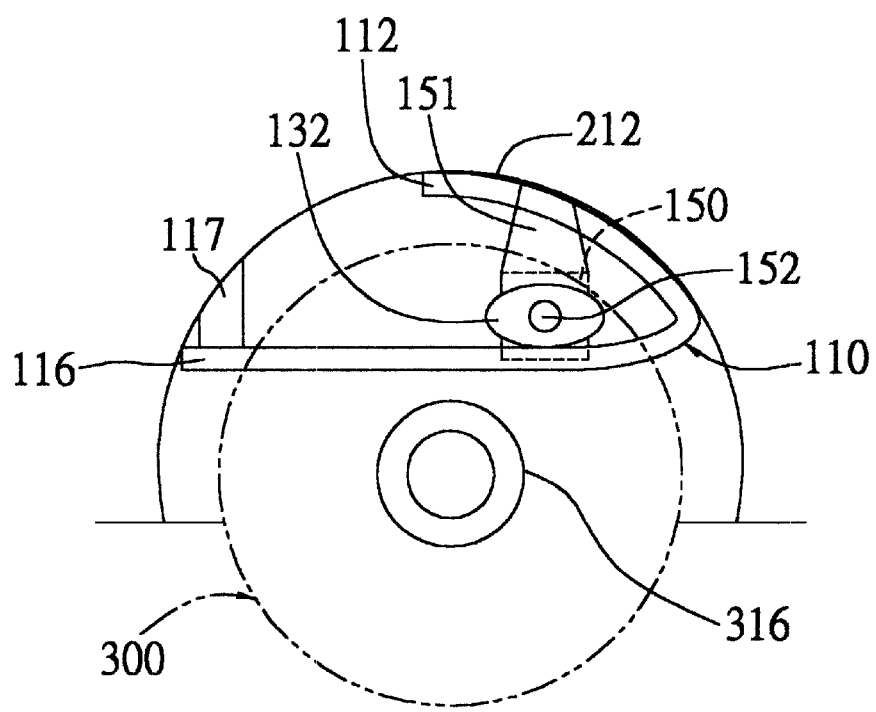
FIG. 5 is a schematic diagram showing another operational status of the brake auxiliary device according to the invention.

When the driver steps on the brake pedal 220, the first and second power switches 222, 224 are adapted to be on, allowing power to be transmitted from the power source 200 to the drive member 150, so as to drive the transmission member 132 to rotate. As shown in FIG. 4, when the transmission member 132 rotates to be in an upright position with its longer axis being vertically in contact with the lower support portion 116 of the resilient member 110, the lower support member 116 would be pressed downwardly to abut against the wheel shaft 316 of the rear wheel 3. The wheel shaft 316, being downwardly pressed, would accordingly generate a reaction force upwardly directed to allow the connecting portion 151 acting on the bottom surface 212 of the vehicle S to help lift up the vehicle body. As shown in FIG. 5, when the transmission member 132 rotates to be in a horizontal position with its longer axis being substantially in parallel to the lower support portion 116, the upwardly-directed reaction force to lift up the vehicle body would be removed, and the bottom surface 212 of the vehicle S is restored back to the original position. Therefore, as the transmission member 132 is driven by the drive member 150 to continuously rotate alternately to be in upright and horizontal positions, regularly up and down vibrations of the vehicle body can be generated, such that vertical upright pressure applied from the wheel 3 to the ground would be raised as well as friction between the wheel 3 and the ground would be increased; this thereby helps reduce a braking distance required for decelerating the vehicle S to stop in favor of driving safety.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A brake auxiliary device applied to a wheel of a vehicle, the brake auxiliary device comprising;

a resilient mechanism having an upper support member mounted on a bottom surface of the vehicle at a position corresponding to the wheel, and a lower support member properly spaced apart from the upper support member and positioned above a shaft of the wheel;

a transmission mechanism positioned between the upper and lower support members of the resilient mechanism in a manner that, the transmission mechanism rotatably abuts against the lower support member; and a drive mechanism connected to the bottom surface of the vehicle by a connecting member, and electrically coupled to the transmission mechanism for outputting power to operationally drive the transmission mechanism;

wherein when the transmission mechanism is driven to rotate by power outputted from the drive mechanism, rotation of the transmission mechanism operates to induce displacement of the lower support member with respect to the upper support member of the resilient mechanism, and thus to generate up and down movement for the vehicle, so as to raise vertical upright pressure applied from the wheel of the vehicle to the ground, and to thereby increase friction between the wheel and the ground in favor of braking implementation.

2. The brake auxiliary device of claim 1, wherein the resilient mechanism is bent in shape to form the upper and lower support members interconnected by a connecting portion.

3. The brake auxiliary device of claim 1, wherein the upper support member is connected at an end position thereof to the lower support member of the resilient mechanism by at least a resilient member.

4. The brake auxiliary device of claim 3, wherein the resilient member is a spring.

5. The brake auxiliary device of claim 3, wherein the resilient member is made of elastomer.

6. The brake auxiliary device of claim 1, wherein the transmission mechanism is shaped as an ellipse having a relatively longer axis and a relatively shorter axis.

7. The brake auxiliary device of claim 6, wherein the relatively longer axis of the elliptic transmission mechanism rotates to be vertically in contact with the lower support member of the resilient mechanism and thus to press on the lower support member for inducing the displacement of the lower support member, which accordingly generates a reaction force to elicit upward movement of the vehicle.

8. The brake auxiliary device of claim 1, wherein the transmission mechanism is an eccentric having a relatively larger portion and a relatively smaller portion with respect to a pivot of the eccentric.

9. The brake auxiliary device of claim 8, wherein the relatively larger portion of the eccentric transmission mechanism rotates to be in contact with the lower support member of the resilient mechanism and thus to press on the lower support member for inducing the displacement of the lower support member, which accordingly generates a reaction force to elicit upward movement of the vehicle.

10. The brake auxiliary device of claim 1, wherein the drive mechanism is a retarded motor with a power input port electrically connected to an external power source.

11. The brake auxiliary device of claim 1, wherein an abutment member is provided on the bottom surface of the vehicle at a position corresponding to the lower support member of the resilient mechanism, allowing the lower support member to detachably abut against the abutment member.

* * * * *